US012249274B2

(12) United States Patent
Yin et al.

(10) Patent No.: US 12,249,274 B2
(45) Date of Patent: Mar. 11, 2025

(54) DISPLAY DEVICE CAPABLE OF IN-DISPLAY SENSING

(71) Applicant: Guangzhou Tyrafos Semiconductor Technologies Co., Ltd., Guangzhou (CN)

(72) Inventors: Ping-Hung Yin, Hsinchu (TW); Jia-Shyang Wang, Miaoli County (TW); Yu Hsiang Wang, Hsinchu (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 0 days.

(21) Appl. No.: 18/500,181

(22) Filed: Nov. 2, 2023

(65) Prior Publication Data

US 2024/0153458 A1 May 9, 2024

Related U.S. Application Data

(60) Provisional application No. 63/422,456, filed on Nov. 4, 2022.

(51) Int. Cl.

*G09G 3/32* (2016.01)
*G09G 3/3208* (2016.01)
*G09G 3/3233* (2016.01)
*G09G 3/3275* (2016.01)

(52) U.S. Cl.

CPC ............. *G09G 3/32* (2013.01); *G09G 3/3208* (2013.01); *G09G 3/3233* (2013.01); *G09G 3/3275* (2013.01); *G09G 2300/0819* (2013.01); *G09G 2300/0842* (2013.01); *G09G 2300/0852* (2013.01); *G09G 2300/0861* (2013.01); *G09G 2310/0208* (2013.01); *G09G 2310/0251* (2013.01); *G09G 2310/0291* (2013.01); *G09G 2310/067* (2013.01); *G09G 2310/08* (2013.01); *G09G 2320/045* (2013.01); *G09G 2360/14* (2013.01); *G09G 2360/148* (2013.01)

(58) Field of Classification Search

CPC ................... G09G 3/32–3291; G09G 2360/14
See application file for complete search history.

(56) References Cited

U.S. PATENT DOCUMENTS 9,741,290 B1 * 8/2017 Lee ...................... G09G 3/3233
10,714,554 B2 * 7/2020 Choo ................... H10K 59/351
11,733,807 B2 * 8/2023 Lin ...................... G09G 3/3233 345/175
2018/0151656 A1 * 5/2018 Choo ................ H10K 59/1213

(Continued)

*Primary Examiner* — Gene W Lee

(57) ABSTRACT

A display device includes a display panel having a plurality of sub-pixel areas, each including a pixel circuit, each pixel circuit including: a diode, configured to be in a forward-biasing state during a display phase of the pixel circuit for light-emitting and configured to be in a reverse-biasing state in a sensing phase of the pixel circuit to generate a sensing voltage; a driving transistor for driving the diode during the display phase; a readout transistor, with a gate receiving the sensing voltage during the sensing phase to serve as a source follower; first to seventh transistors, gate control signals applied to the gates of the first to seventh transistors so that the pixel circuit switches between the display phase and the sensing phase; and a capacitor for storing a data voltage to be written to the diode in the display phase.

8 Claims, 10 Drawing Sheets

(56) References Cited

U.S. PATENT DOCUMENTS

| | | | | |
|---|---|---|---|---|
| 2022/0301503 | A1* | 9/2022 | Yan | G09G 3/3225 |
| 2023/0132555 | A1* | 5/2023 | Inoue | G06V 10/145<br>257/40 |
| 2023/0317007 | A1* | 10/2023 | Kim | G09G 3/3233<br>345/76 |

* cited by examiner

DISPLAY DEVICE CAPABLE OF IN-DISPLAY SENSING

BACKGROUND OF THE INVENTION

1. Field of the Invention

The present invention relates generally to a display device, and more particularly, to a display device able to realize both display and sensing functions in the same pixel circuit to provide an in-screen sensing function.

2. The Prior Arts

In general, a display device often only has a display function. Some display devices provides both display and touch functions. However, when sensing is required, for example, when an optical fingerprint sensor (OFPS) is used for sensing, the optical fingerprint sensor will need to be implemented as an independent device. In addition, when the optical sensing module is bonded under the display device, there will be additional cost, additional thickness, and additional yield risk during bonding.

Moreover, since the sensing area depends on the area of the sensor, the sensing area will be much smaller than the area of the entire panel. In addition, since the optical sensing module is attached to the bottom of the display device, components between the sensed object and the sensor may block the light.

Therefore, it is necessary to provide a display device that can integrate the sensing function and the display function in the same pixel circuit to overcome the above problems.

SUMMARY OF THE INVENTION

In order to achieve the objective of effectively solving the above problems, the present invention provides a display device, including: a display panel having a plurality of sub-pixel areas, each sub-pixel area including a pixel circuit, each pixel circuit including: a diode, configured to a forward-biasing state in a display phase of the pixel circuit for light-emitting and configured to a reverse-biasing state in a sensing phase of the pixel circuit for light-sensing; a driving transistor, for driving the diode in the display phase; a readout transistor, with a gate being applied with the sensing voltage in the sensing phase for serving as a source follower; first to seventh transistors, gates of the first to seventh transistors being applied with gate control signals, so that the pixel circuit switching between the display phase and the sensing phase; and a capacitor, for storing a data voltage to be written to the diode in the display phase; a first circuit, by applying gate control signals to each pixel circuit to make each pixel circuit switch between the display phase and the sensing phase respectively; and a second circuit, for applying an initialization voltage, the data voltage, a driving voltage, and a common voltage, and the second circuit comprising a plurality of readout circuits for reading out the sensing voltage during the sensing phase of the pixel circuit.

Preferably, the gate control signal includes first to fourth gate control signals, and the first gate control signal is applied to the gates of the first transistor and the fifth transistor, the second gate control signal is applied to the gates of the second transistor and the third transistor, the third gate control signal is applied to the gates of the fourth transistor and the sixth transistor, and the fourth gate control signal is applied to the gate of the seventh transistor.

Preferably, the diode comprises one of a micro light-emitting diode (micro-LED), a sub-millimeter light-emitting diode (mini-LED), and an organic light-emitting diode (OLED); and the driving transistor and the first to seventh transistors comprise one of or any combination of P-type metal oxide semiconductor field effect transistors (MOSFET), N-type MOSFETs, thin film transistors (TFT), low-temperature polycrystalline silicon TFTs, and low-temperature polycrystalline oxide TFTs.

Preferably, each readout circuit is connected to a corresponding pixel circuit of a plurality of pixel circuits in the same row to read out the sensing voltages in the pixel circuits in the row, and each readout circuit includes an analog-to-digital converter to perform analog-to-digital conversion for reading out the sensing voltage.

Preferably, in each pixel circuit, a first electrode of the first transistor is applied with the driving voltage, a second electrode of the first transistor is connected to a first node, a first electrode of the second transistor is applied with the data voltage, a second electrode of the second transistor is connected to the first node, a first electrode of the third transistor is connected to a second node, and a second electrode of the third transistors is connected to a third node, a first electrode of the fourth transistor is connected to the second node, and a second electrode of the fourth transistor is connected to a fourth node, a first electrode of the fifth transistor is connected to the third node, a second electrode of the fifth transistor is connected to a fifth node, a first electrode of the sixth transistor is connected to the fourth node, a second electrode of the sixth transistor is connected to the fifth node, a first electrode of the seventh transistor is connected to the fourth node, a second electrode of the seventh transistor is connected to the first electrode of the readout transistor, a gate electrode of the driving transistor is connected to the second node, a first electrode of the driving transistor is connected to the first node, a second electrode of the driving transistor is connected to the third node, a gate of the readout transistor is connected to the fifth node, the first electrode of the readout transistor is connected to the second electrode of the seventh transistor, a second electrode of the readout transistor is applied with the common voltage, a first electrode of the diode is connected to the fifth node, a second electrode of the diode is applied with the common voltage, one end of the capacitor is applied with the driving voltage, the other end is connected to the second node, and the initialization voltage is applied to the fourth node.

Preferably, the sensing phase includes: a first sensing phase, for initializing the pixel circuit and the diode, so that the pixel circuit can write the data voltage and the diode is in the reverse-biasing state; and a second sensing phase, wherein the diode begins to accumulate charges to generate the sensing voltage and the sensing voltage is read out, and the display phase includes: a first display phase, for writing the data voltage; and a second display phase, for causing the diode to emit light according to the data voltage.

Preferably, in the first sensing phase, the first to fourth gate control signals control the first to seventh transistors, so that the fourth transistor and the sixth transistor are on, while the first transistor, the second transistor, the third transistor, the fifth transistor, and the seventh transistor are off until the fourth transistor are turned off before the second sensing phase starts; in the second sensing phase, the first to fourth gate control signals control the first to seventh transistors so that the seventh transistor is on, the first transistor, the second transistor, the third transistor, the fourth transistor, the fifth transistor, and the sixth transistor are off until the seventh transistor is turned off before the first display phase starts; in the first display phase, the first to fourth gate control signals control the first to seventh transistors, so that the second transistor and the third transistor are on, while the first transistor, the fourth transistor, the fifth transistor, the sixth transistor and the seventh transistor are off; and in the second display phase, the first to fourth gates control signal controls the first to seventh transistors, so that the second transistor, the third transistor, the fourth transistor, the sixth transistor and the seventh transistor are off, while the first transistor and the fifth transistor are turned on after the second display phase starts.

Preferably, in the second sensing phase, the readout transistor is used as the source follower, so that the sensing voltage is input to the gate of the readout transistor through the fifth node, and the sensing voltage is read out as an output voltage located in the readout circuit.

Preferably, the display panel includes a plurality of panel areas, each panel area includes a first pixel row to a j-th pixel row, each pixel row includes a plurality of sub-pixel areas, and by applying the gate control signals to each pixel circuit, after a pixel row of a panel area completing the sensing phase, a corresponding pixel row in the next panel area immediately executes the sensing phase.

Preferably, the display device further includes a compensation comparison part, for comparing and calibrating the sensing voltage of the diode based on display content of the diode of the pixel circuit in the display phase adjacent to the diode of the pixel circuit in the sensing phase.

The present invention will be apparent to those skilled in the art by reading the following detailed description of a preferred embodiment thereof, with reference to the attached drawings.

DETAILED DESCRIPTION OF THE PREFERRED EMBODIMENT

Figure 1A:
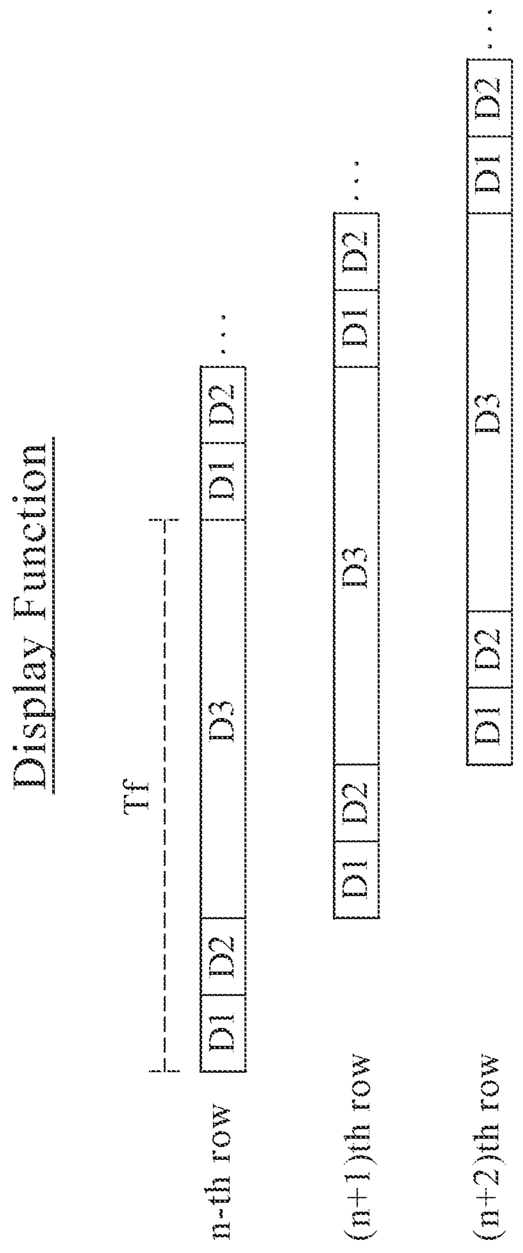
FIG. 1A is an operation timing diagram of a display device with only a display function.

The accompanying drawings are included to provide a further understanding of the invention, and are incorporated in and constitute a part of this specification. The drawings illustrate embodiments of the invention and, together with the description, serve to explain the principles of the invention.

The inventive concept will be explained more fully hereinafter with reference to the accompanying drawings in which exemplary embodiments of the inventive concept are shown. Advantages and features of the inventive concept and methods for achieving the same will be apparent from the following exemplary embodiments, which are set forth in more details with reference to the accompanying drawings. However, it should be noted that the present inventive concept is not limited to the following exemplary embodiments, but may be implemented in various forms. Accordingly, the exemplary embodiments are provided merely to disclose the inventive concept and to familiarize those skilled in the art with the type of the inventive concept. In the drawings, exemplary embodiments of the inventive concepts are not limited to the specific examples provided herein and are exaggerated for clarity.

The terminology used herein is used to describe particular embodiments only, and is not intended to limit the present invention. As used herein, the singular terms "a" and "the" are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element (e.g., a layer, region, or substrate) is referred to as being "on" another element, it can be directly on the other element or intervening elements may be present. In contrast, the term "directly" means that no intervening elements are present. It should be further understood that when the terms "comprising" and "including" are used herein, it is intended to indicate the presence of stated features, steps, operations, elements, and/or components, but does not exclude one or more other features, steps, operations, elements, components, and/or the presence or addition of groups thereof.

Furthermore, exemplary embodiments in the detailed description are set forth in cross-section illustrations that are idealized exemplary illustrations of the present inventive concepts. Accordingly, the shapes of the exemplary figures may be modified according to manufacturing techniques and/or tolerable errors. Therefore, the exemplary embodiments of the present inventive concept are not limited to the specific shapes shown in the exemplary figures, but may include other shapes that may be produced according to the manufacturing process. The regions illustrated in the figures have general characteristics and are used to illustrate specific shapes of elements. Therefore, this should not be considered limited to the scope of this creative concept.

It will also be understood that, although the terms "first," "second," "third," etc. may be used herein to describe various elements, these elements should not be limited by these terms. These terms are only used to distinguish each element. Thus, a first element in some embodiments could be termed a second element in other embodiments without departing from the teachings of the present creation. Exemplary embodiments of aspects of the present inventive concept illustrated and described herein include their complementary counterparts. Throughout this specification, the same reference numbers or the same designators refer to the same elements.

Furthermore, example embodiments are described herein with reference to cross-sectional and/or planar views, which are illustrations of idealized example illustrations. Accordingly, deviations from the shapes shown, for example, caused by manufacturing techniques and/or tolerances, are expected. Accordingly, the exemplary embodiments should not be considered limited to the shapes of the regions shown herein, but are intended to include deviations in shapes resulting from, for example, manufacturing. Thus, the regions illustrated in the figures are schematic and their shapes are not intended to illustrate the actual shape of a region of a device and are not intended to limit the scope of example embodiments.

It should be noted that the pixel circuit of the present invention can be implemented in any sub-pixel such as red sub-pixel, blue sub-pixel, green sub-pixel, white sub-pixel, etc., but the present invention is not limited thereto.

Refer to FIG. 1A. FIG. 1A is an operation timing diagram of a display device with only a display function. As shown in FIG. 1A, the display device with only a display function is displayed in a row-by-row manner, from the upper left corner to the lower right corner, and finally forms an image frame. One frame time Tf includes: the first display phase D1, which is used to initialize the circuit; the second display phase D2, for writing data; and a third display phase D3, which is used to emit light to display data. Since the display device only has a display function, one frame time Tf is equal to the sum of the first display phase D1 to the third display phase D3.

It should be understood that when the circuit is actually operating, there will be switching time between each phase. For ease of understanding, in this specification, the duration of each phase includes the actual execution of the corresponding action and switching to the next phase. For example, the second display phase D2 includes the time of writing data and switching to the third display phase D3.

Figure 1B:
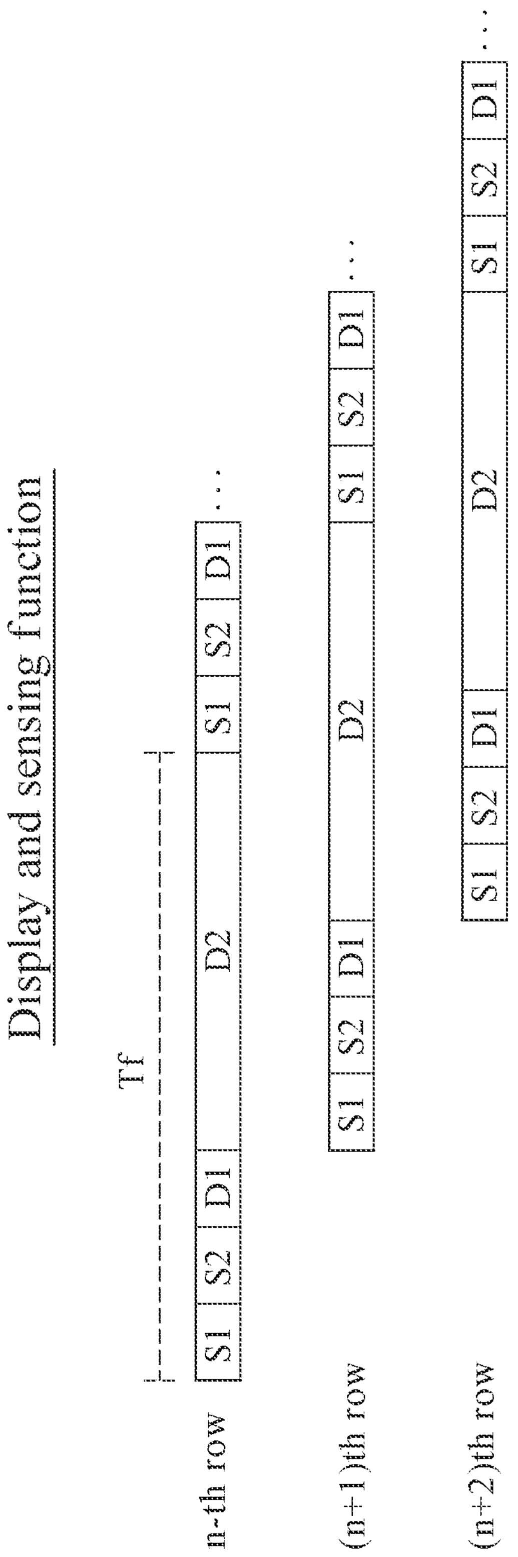
FIG. 1B is an operation timing diagram of the display device of the present invention.

Refer to FIG. 1B, which is an operation timing diagram of the display device of the present invention. Since the present invention integrates the sensing function and the display function into the same pixel circuit in the display device, the frame time Tf of the present invention further includes a sensing phase for sensing data. Therefore, through the control of the gate control signal, the operation timing of the display device of the present invention is adjusted to include a first sensing phase S1, a second sensing phase S2, a first and a display phase, which includes the first display phase D1 and a second display phase D2.

It should be further explained that the present invention integrates the first display phase for initializing the circuit in FIG. 1A into the first sensing phase S1 of the present invention, so that the pixel circuit 10 of the display device can be activated to write the data directly in the display phase D1. Therefore, in the present invention, one frame time Tf includes: the first sensing phase S1, which is used to initialize the pixel circuit 10 so that the pixel circuit 10 can write data and enable the diode and make the LED in reverse-biasing; the second sensing phase S2 is used for the diode LED to collect light and read the generated sensing voltage to the outside of the pixel circuit 10; the first display phase D1 is used to write data; the second display phase D2 is used to emit light to display data.

It can be understood that, according to the user's settings, the pixel circuits in the display device may be in different phases at the same point in time. For example, the pixel circuits in different rows may be in different phases. In addition, since the sensing phase and display phase of the present invention are achieved by controlling the gate control signal GCS to adjust the operating sequence, the sensing phase of the display device can be turned on or off at any time according to the user's settings and needs.

Figure 2:
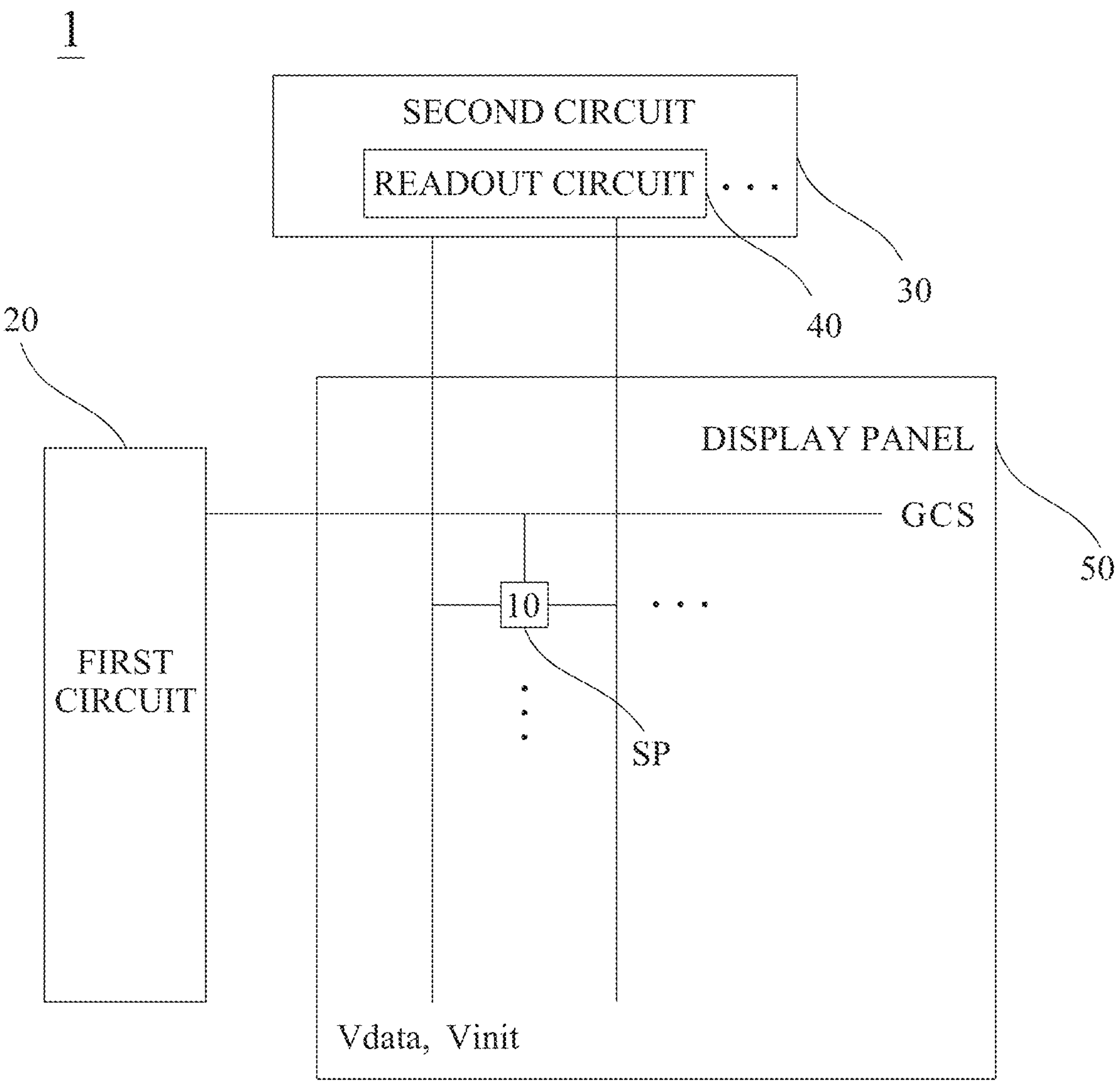
FIG. 2 is a structural diagram of a display device according to an embodiment of the present invention.

Refer to FIG. 2, which is a structural diagram of the display device 1 of the present invention.

As shown in FIG. 2, the display device 1 of the present invention includes: a display panel 50, including a plurality of sub-pixel areas SP, each including a pixel circuit 10; a first circuit 20, by applying gate control signals GCS to each pixel circuit 10, so that each pixel circuit 10 switches between the display phase D and the sensing phase S respectively; for example, the first circuit 20 can be a row circuit; and a second circuit 30, used to apply the data voltage Vdata, and including a plurality of readout circuits 40, wherein each readout circuit 40 is connected to a plurality of pixel circuits 10 in the same row, for reading out the light sensed by the diodes LED in the pixel circuits 10 of the row in the sensing phase S, for example, the second circuit 30 may be a column circuit.

It should be understood that the first circuit 20 may be, for example, one of a column circuit or a row circuit. The second circuit 30 may be, for example, one of a row circuit or a column circuit. But the present invention is not limited to thereto.

Figure 3:
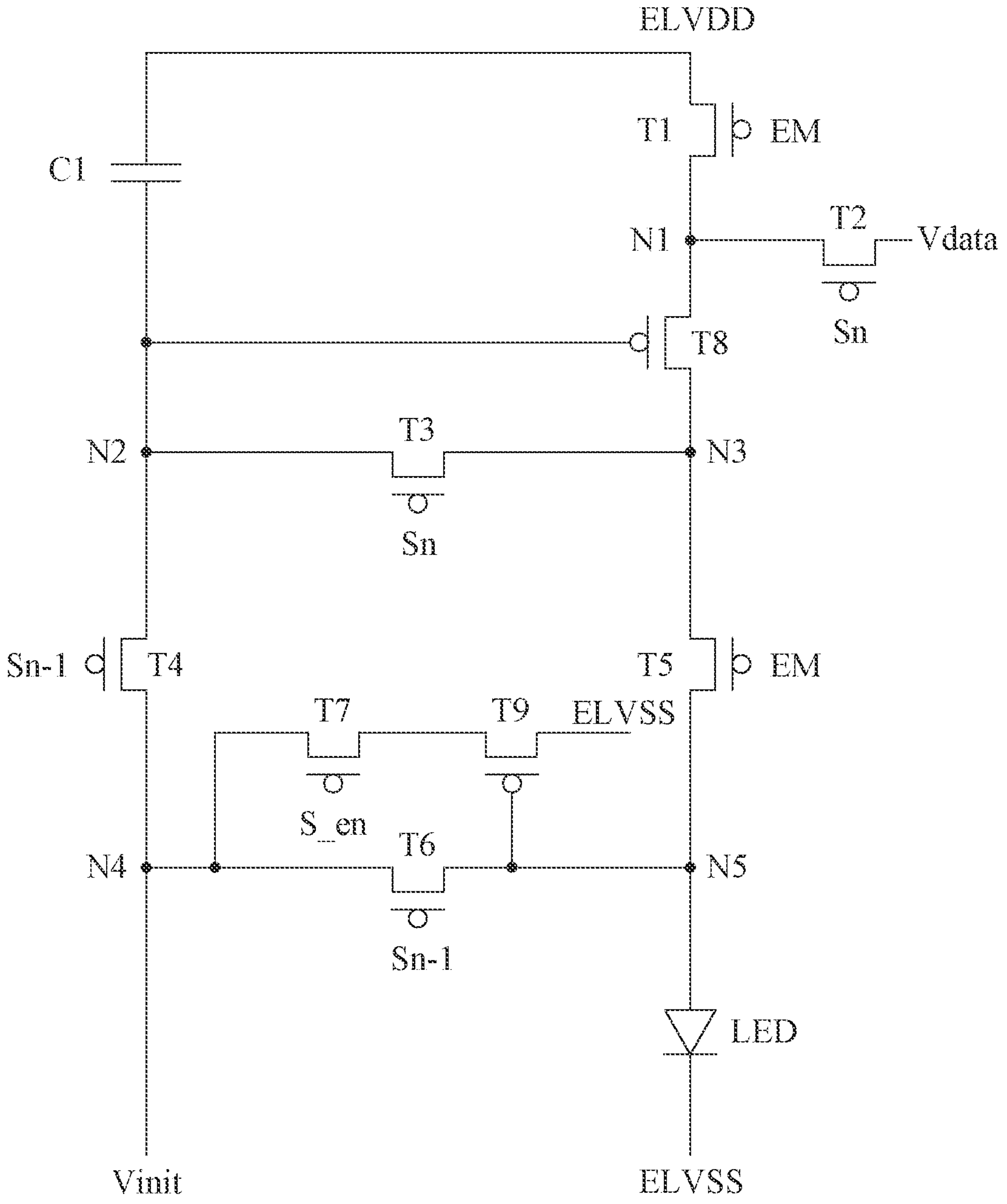
FIG. 3 is a circuit diagram of a pixel circuit according to the embodiment of the present invention.

Refer to FIG. 3, which is a circuit diagram of the pixel circuit 10 according to an embodiment of the present invention.

As shown in FIG. 3, the pixel circuit 10 of the present invention includes: first to seventh transistors T1 to T7; a driving transistor T8; a readout transistor T9; a diode LED; and a capacitor C1. The gate control signals GCS include a first gate control signal EM, a second gate control signal Sn, a third gate control signal Sn−1, and a fourth gate control signal S_en. The first transistor T1 is controlled by the first gate control signal EM, the second transistor T2 is controlled by the second gate control signal Sn, the third transistor T3 is controlled by the second gate control signal Sn, the fourth transistor T4 is controlled by the third gate control signal Sn−1, the fifth transistor T5 is controlled by the first gate control signal EM, the sixth transistor T6 is controlled by the third gate control signal Sn−1, and the seventh transistor T7 is controlled by the fourth gate control signal S_en. In addition, the data voltage Vdata, the initialization voltage Vinit, the driving voltage ELVDD, and the common voltage ELVSS are applied to the pixel circuit 10.

Referring to FIG. 3, in the pixel circuit 10: a first electrode of the first transistor T1 is applied with the driving voltage ELVDD, and a second electrode of the first transistor T1 is connected to the first node N1; a first electrode of the second transistor T2 is applied with the data voltage Vdata, and a second electrode of the second transistor T2 is connected to the first node N1; a first electrode of the third transistor T3 is connected to the second node N2, and a second electrode of the third transistor T3 is connected to the third node N3; a first electrode of the fourth transistor T4 is connected to the second node N2, and a second electrode of the fourth transistor T4 is connected to the fourth node N4; a first electrode of the fifth transistor T5 is connected to the third node N3, and a second electrode of the fifth transistor T5 is connected to the fifth node N5; a first electrode of the sixth transistor T6 is connected to the fourth node N4, and a second electrode of the sixth transistor T6 is connected to the fifth nodes N5; a first electrode of the seventh transistor T7 is connected to the fourth node N4, and a second electrode of the seventh transistor T7 is connected to a first electrode of the readout transistor T9; a gate electrode of the driving transistor T8 is connected to the second node N2, a first electrode of the driving transistor T8 is connected to the first node N1, and a second electrode of the driving transistor T8 is connected to the third node N3; a gate electrode of the readout transistor T9 is connected to the fifth node N5, the first electrode of the readout transistor T9 is connected to the second electrode of the seventh transistor T7, and a second electrode of the readout transistor T9 is applied with the common voltage ELVSS; a first electrode of the diode LED is connected to the fifth node N5, and a second electrode of the diode LED is applied with the common voltage ELVSS; one end of the capacitor C1 is applied with the driving voltage ELVDD, and the other end is connected to the second node N2; and the initialization voltage Vinit is applied to the fourth node N4.

It should be noted that the display device of the present invention divides the pixel circuit 10 into a sensing phase and a display phase by applying the gate control signals GCS. In the sensing phase, the diode LED is under reverse bias to sense light as a photodiode. Then, the generated photocurrent changes the voltage of the first electrode of the diode LED to the sensing voltage Vsen. Finally, the sensing transistor T9 is used as a source follower, and the sensing voltage Vsen is read out by the sensing circuit 40. In the display phase, the diode LED is under forward bias to emit light as a light-emitting diode to display data according to the data voltage Vdata. It can be understood that the diode LED of the present invention includes, but is not limited to, micro-LEDs, sub-millimeter light-emitting diodes (mini-LEDs), and organic light-emitting diodes (OLEDs).

It should be understood that the embodiment of the present invention uses a P-type metal oxide semi-field effect transistor (PMOS) as an exemplary transistor in the pixel circuit 10, so applying a high voltage to the gate of the transistor will cause it to turns off, and applying a low voltage to its gate turns it on. However, the present invention is not limited to thereto. The transistor used in the sub-pixel circuit of the present invention can be arbitrarily implemented as PMOS, N-type metal oxide semi-field effect transistor (NMOS), thin film transistor (TFT), low-temperature polycrystalline silicon (LTPS) TFT, low-temperature polycrystalline Oxide (LTPO) TFT and more. In addition, transistors can also be arbitrarily combined to form the sub-pixel circuit of the present invention. For example, some transistors are implemented as PMOS and other transistors are implemented as NMOS. Therefore, those skilled in the art can easily understand that the inventive concept of the present invention can be applied to pixel circuits using various types of transistors without being limited by the characteristics of the transistors.

Figure 4:
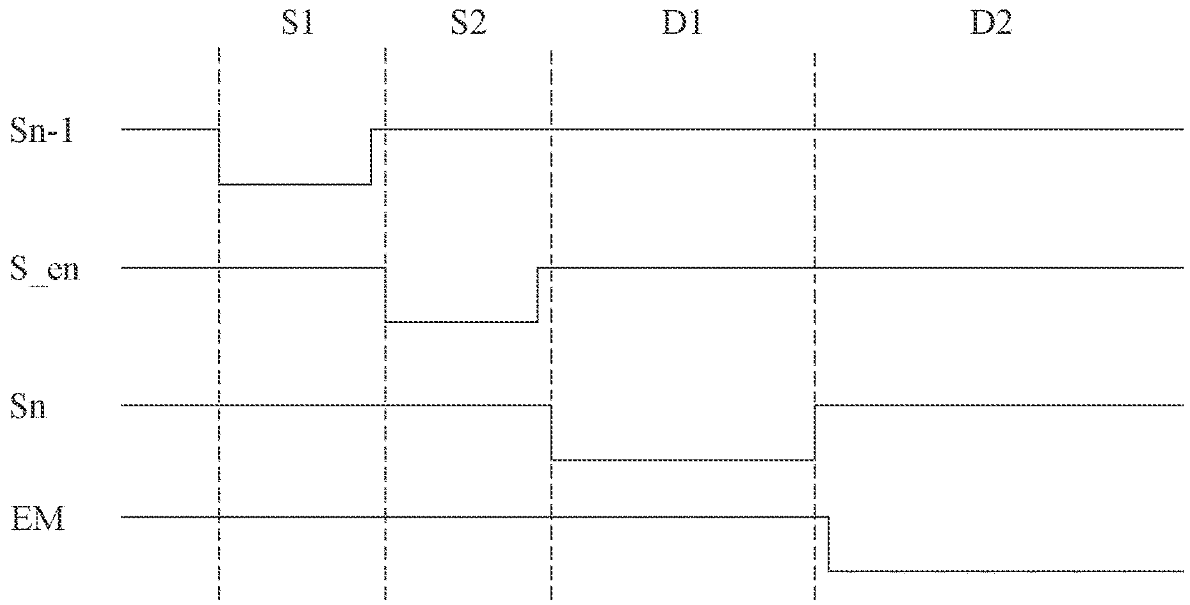
FIG. 4 is a timing operation diagram of the pixel circuit according to the embodiment of the present invention.
Figure 5:
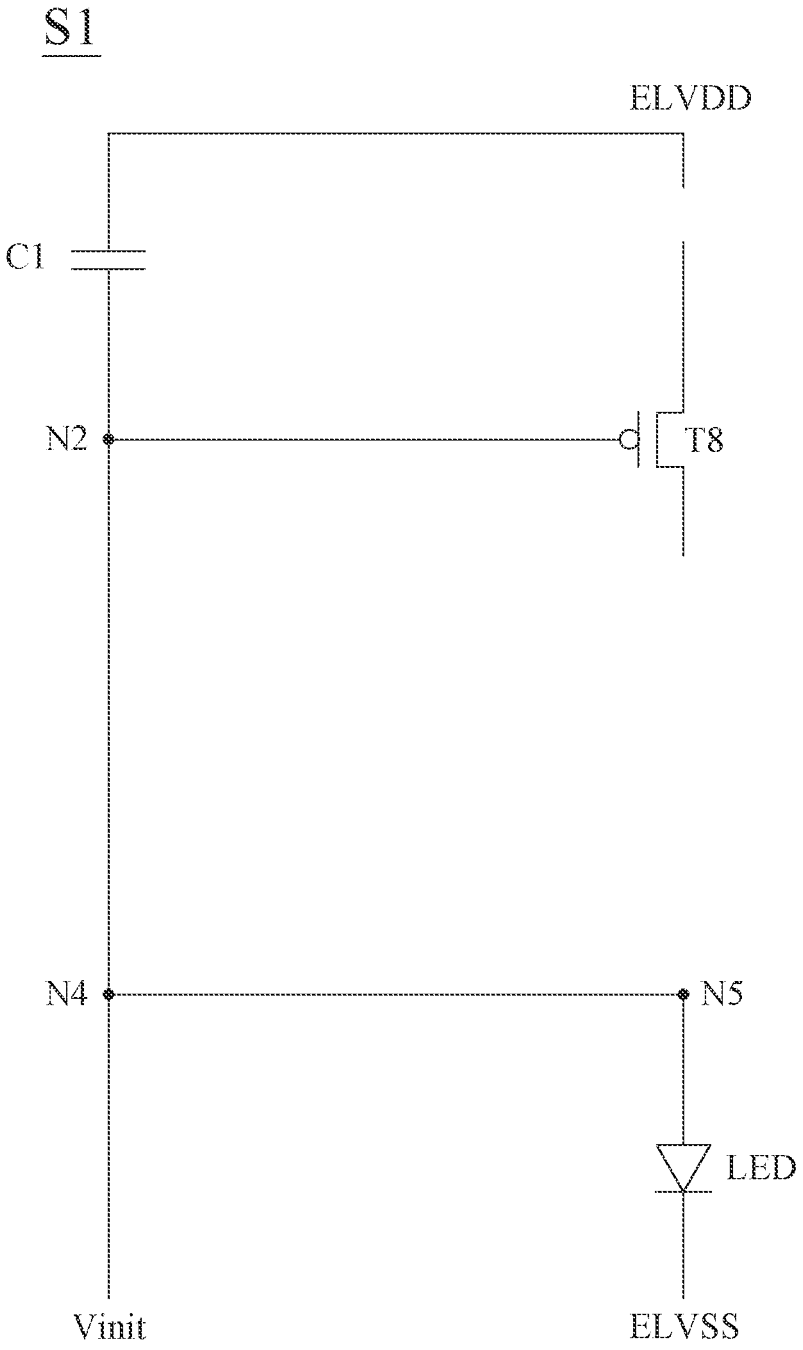
FIG. 5 is an equivalent circuit diagram of the first sensing phase of the pixel circuit according to the embodiment of the present invention.

The circuit operation of the sensing phase of the pixel circuit 10 according to the embodiment of the present invention will be described below with reference to FIGS. 3-6. FIG. 4 is a timing operation diagram illustrating the pixel circuit 10 according to an embodiment of the present invention; FIG. 5 is an equivalent circuit diagram of the first sensing phase S1 of the pixel circuit 10 according to the embodiment of the present invention; and FIG. 6 is an equivalent circuit diagram of the second sensing phase S2 of the pixel circuit 10 according to the embodiment of the invention.

Referring to FIG. 4, the operation sequence of the pixel circuit 10 of the present invention includes: the first sensing phase S1, for initializing the pixel circuit 10 with the initialization voltage Vinit so that the pixel circuit 10 initializes the capacitor C1 and puts the diode LED under reverse bias; the second sensing phase S2, for the diode LED to collect light and reading out the generated sensing voltage Vsen to the readout circuit 40 located outside the pixel circuit 10; the first display phase D1, for writing the data voltage Vdata; and the second display phase D2, for light-emitting according to the data voltage Vdata.

Specifically, referring to FIGS. 3-5, in the first sensing phase S1, under the control of the first gate control signal EM, the second gate control signal Sn, the third gate control signal Sn−1, and the fourth gate control signal S_en, the fourth transistor T4 and the sixth transistor T6 are on, while the first transistor T1, the second transistor T2, the third transistor T3, the fifth transistor T5, and the seventh transistor T5 are off until the fourth transistor T4 and the sixth transistor T6 are turned off before the second sensing phase S2 starts. Therefore, in FIG. 5, it can be seen that the initialization voltage Vinit can be set so that the diode LED is under reverse bias to sense light as a photodiode. At the same time, the initialization voltage Vinit can be used to initialize the capacitor C1 so that the capacitor C1 can write data in the first display phase D1.

Figure 6:
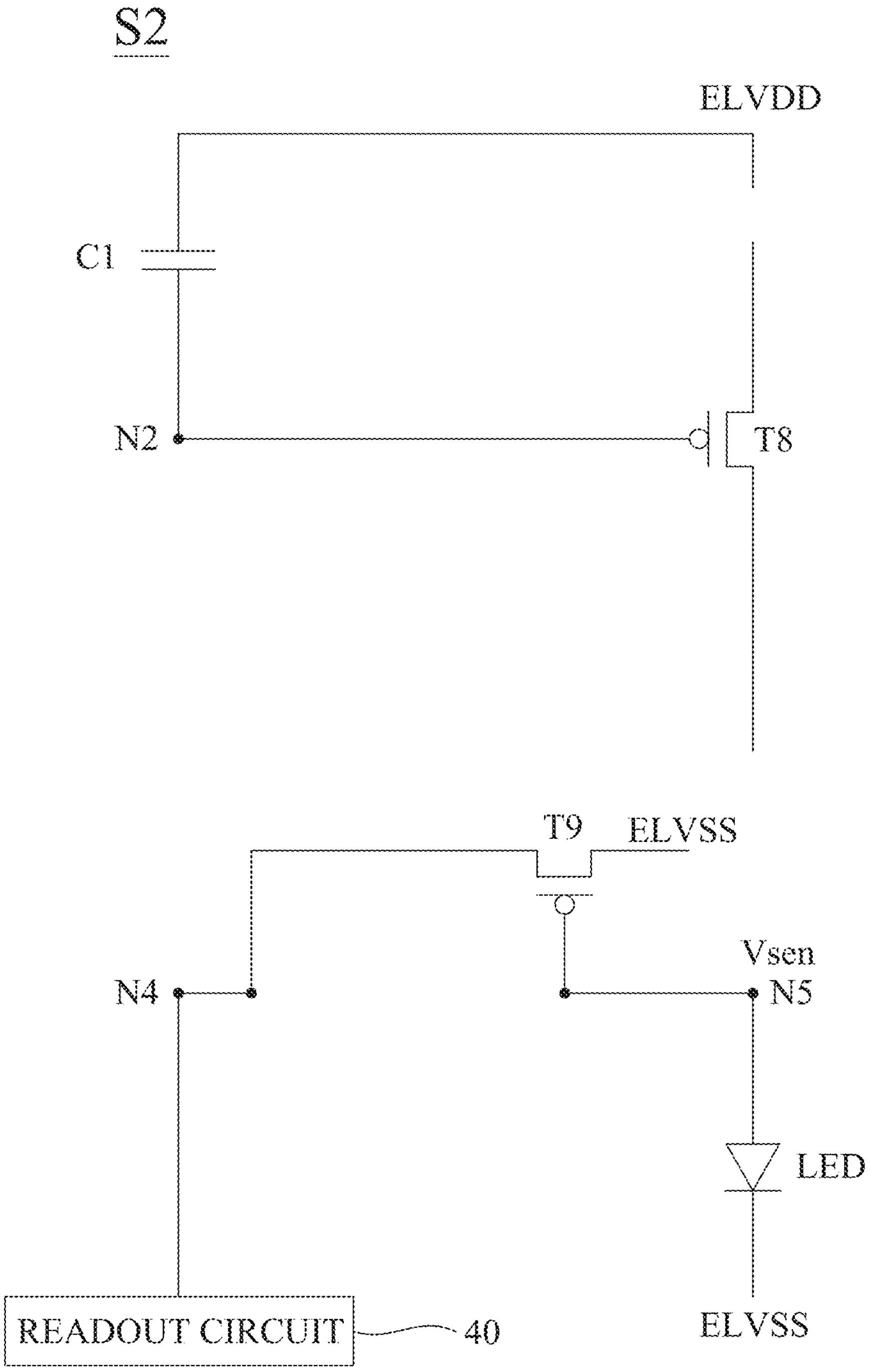
FIG. 6 is an equivalent circuit diagram of the second sensing phase of the pixel circuit according to the embodiment of the present invention.

Specifically, referring to FIGS. 3, 4, and 6, in the second sensing phase S2, under the control of the first gate control signal EM, the second gate control signal Sn, the third gate control signal Sn−1, and the fourth gate control signal S_en, the seventh transistor T7 is on, while the first transistor T1, the second transistor T2, the third transistor T3, the fourth transistor T4, the fifth transistor T5, and the sixth transistor T6 are off until the seventh transistor T7 is turned off before the first display phase D1 starts. Therefore, the diode LED begins to collect light. At this point, the generated photocurrent will change the voltage of the first electrode of the diode LED to the sensing voltage Vsen. Then, the readout transistor T9 is used as a source follower. Finally, the readout circuit 40 reads out the sensing voltage Vsen. It can be understood that the readout circuit 40 may include a current source circuit and an analog-to-digital converter (ADC) (not shown in the figure) to perform analog-to-digital signal conversion to facilitate subsequent signal processing and analysis, but is not limited thereto.

Figure 7:
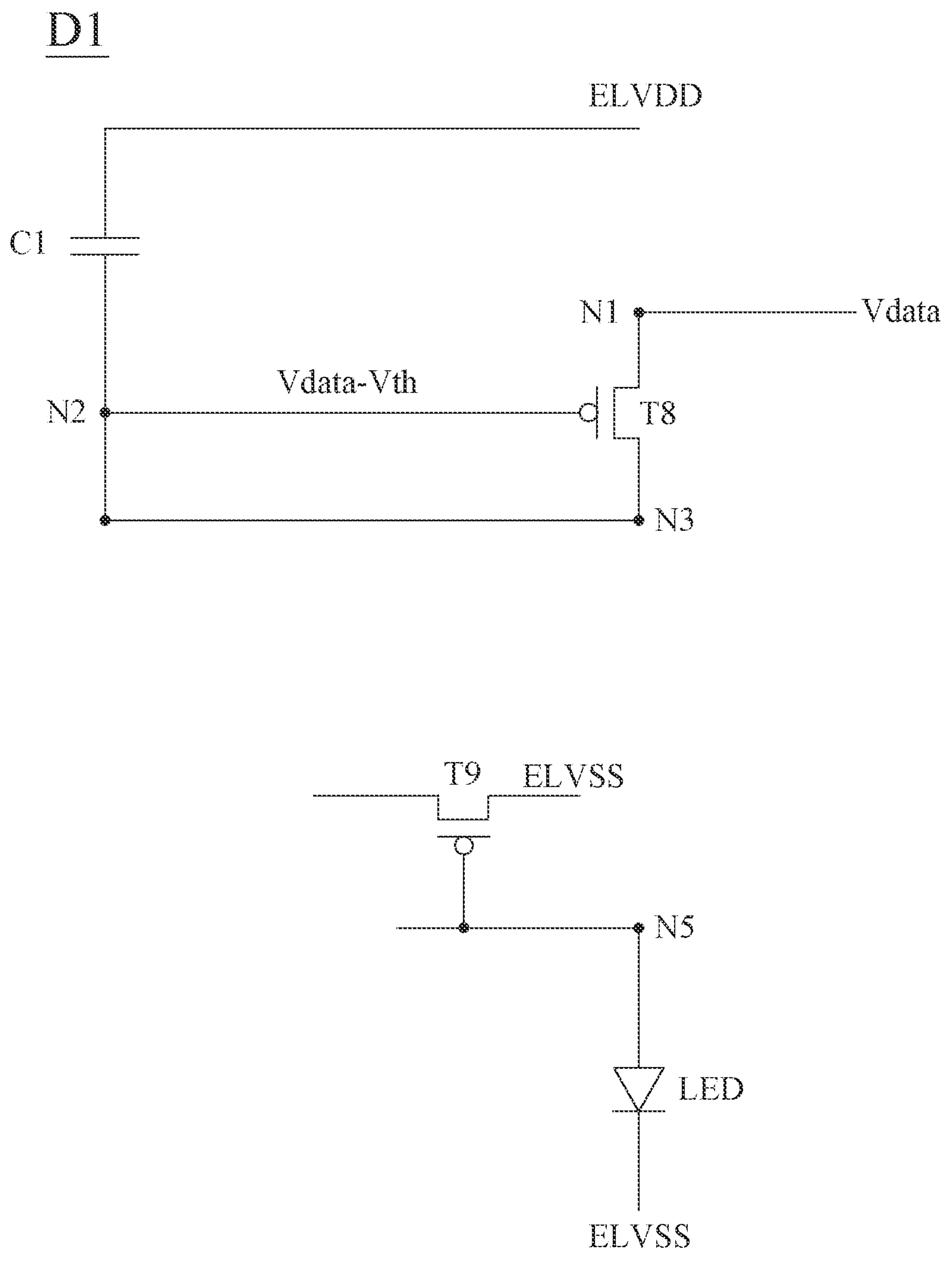
FIG. 7 is an equivalent circuit diagram of the first display phase of the pixel circuit according to the embodiment of the present invention.
Figure 8:
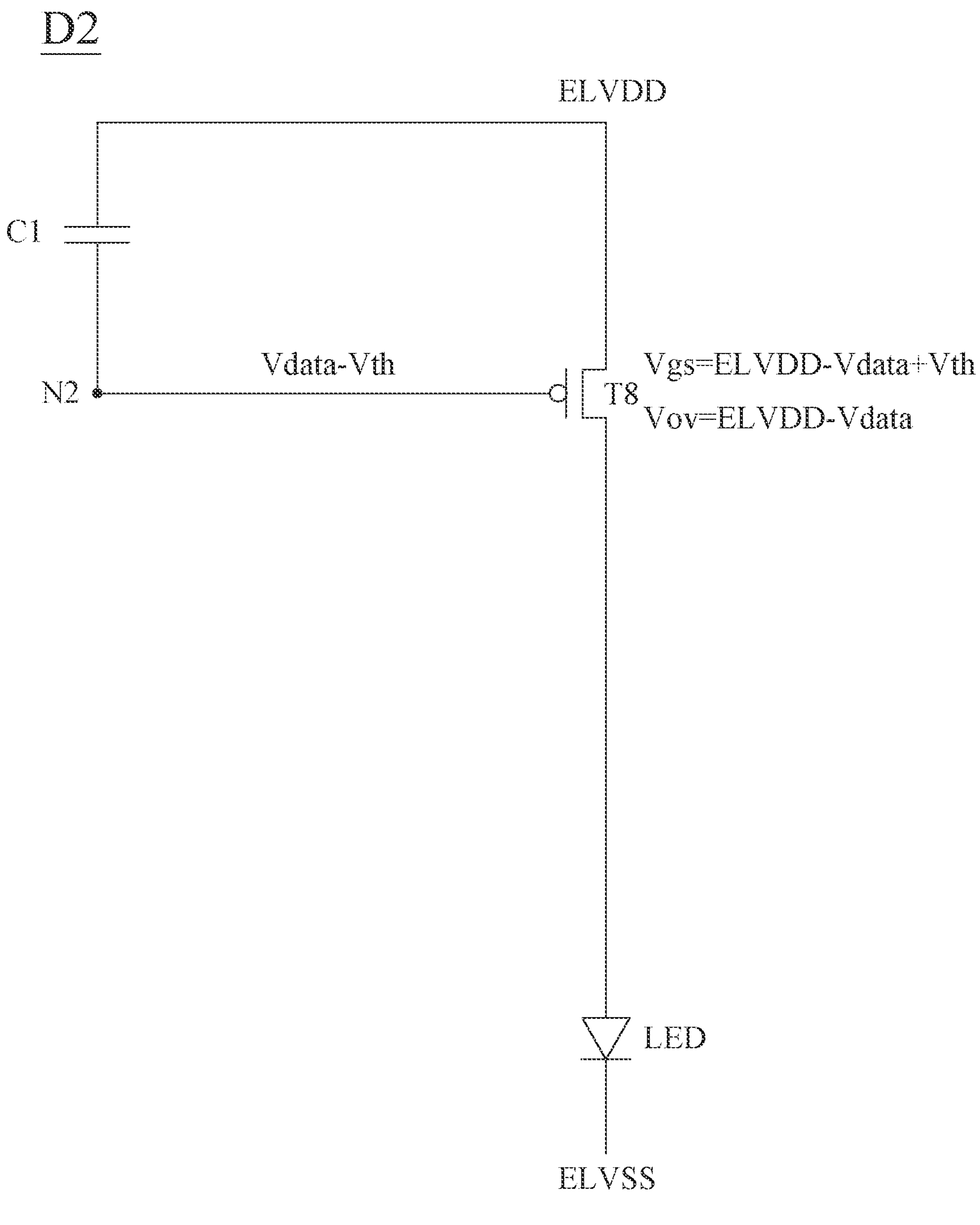
FIG. 8 is a timing operation diagram illustrating the second display phase of the pixel circuit according to the embodiment of the present invention.

The circuit operation of the display phase of the pixel circuit 10 according to the embodiment of the present invention will be described below with reference to FIGS. 3-4 and 7-8. FIG. 7 is an equivalent circuit diagram of the first display phase D1 of the pixel circuit 10 according to the embodiment of the present invention; FIG. 8 is an equivalent circuit diagram of the second display phase D2 of the pixel circuit 10 according to the embodiment of the present invention.

Specifically, referring to FIGS. 3-4 and 7, in the first display phase D1, under the control of the first gate control signal EM, the second gate control signal Sn, the third gate control signal Sn−1, and the fourth gate control signal S_en, the second transistor T2 and the third transistor T3 are on, while the first transistor T1, the fourth transistor T4, the fifth transistor T5, the sixth transistor T6 and the transistor T7 are off. Since the second transistor T2 is on, the data voltage Vdata can be applied to the first electrode of the driving transistor T8. At this point, since the driving transistor T8 is connected in a diode connected manner, the data voltage Vdata is stored in the second node N2 through the driving transistor T8, and is written to the capacitor C1 in a manner of the data voltage Vdata minus the threshold voltage Vth of the driving transistor T8.

Specifically, referring to FIGS. 3-4 and 8, in the second display phase D2, under the control of the first gate control signal EM, the second gate control signal Sn, the third gate control signal Sn−1, and the fourth gate control signal S_en, the first transistor T1 and the fifth transistor T5 are on after the second display phase D2 starts, and the second transistor T2, the third transistor T3, the fourth transistor T4, the sixth transistor T6, and the seventh transistor T7 are off in the second display phase D2. Therefore, in the second display phase D2, the data voltage Vdata minus the threshold voltage Vth written to the capacitor Cst will be used as the gate voltage of the driving transistor T8, and due to the circuit design, the gate-source voltage Vgs of the driving transistor T8 will be (ELVDD-Vdata+Vth). Therefore, the overdrive voltage Vov of the driving transistor T8 will be (ELVDD-Vdata+Vth) minus the threshold voltage Vth. Therefore, the current flowing through the diode will only be controlled by (ELVDD-Vdata) and will not be affected by the individual threshold voltage Vth of the driving transistor T8.

Figure 9:
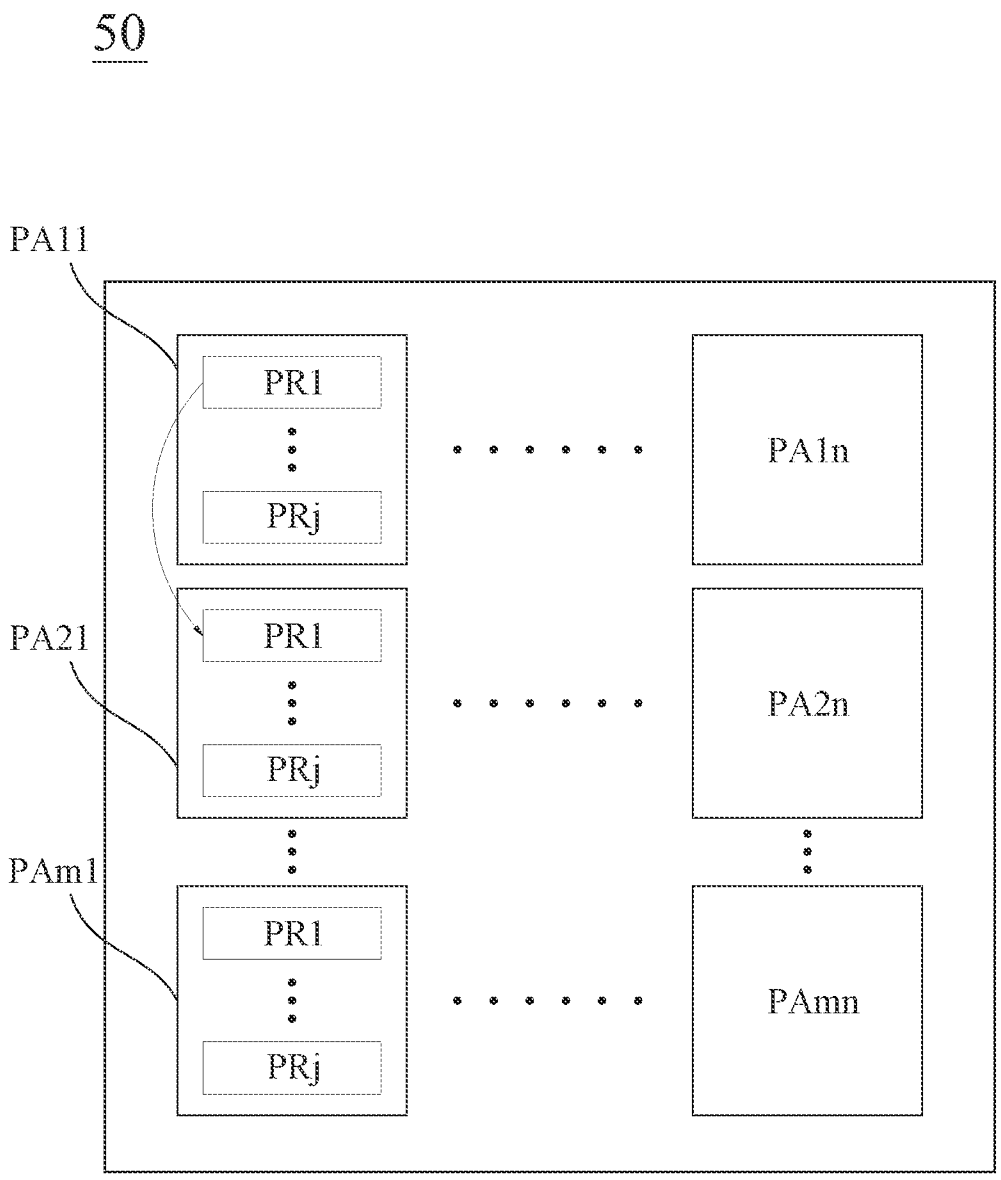
FIG. 9 is schematic view of the control method of the display panel according to the embodiment of the present invention.

Refer to FIG. 9, which is a schematic view of a control method of the display panel 50 according to an embodiment of the present invention.

In the present invention, since the pixel circuit 10 in the display device is used for both display and sensing functions, the display and sensing frame rates of the display device will be the same. However, in general, the response speed required for sensing is usually faster than the frame rate of the display. Therefore, it is necessary to propose a control method for the display panel to improve the sensing speed.

Referring to FIG. 9, the sub-pixel area SP in the display panel 50 of the present invention is divided into a plurality of panel areas PA11 to PAmn. Each panel area PA11 to PAmn includes a plurality of pixel rows PR1 to PRj. Each pixel row PR1 to PRj includes a plurality of sub-pixel areas SP, for example, 16, but are not limited thereto. For example, the panel area PA11 and the panel area PA21 both include the first pixel row PR1 to the j-th pixel row PRj.

The present invention provides a row-skipping sensing of the display panel 50. For example, as shown by the arrow in FIG. 9, after sensing the first pixel row PR1 of the panel area PA11, the second pixel row PR2 to the j-th pixel row PRj of the area PA11 can be skipped directly to sense the first pixel row PR1 of the panel area PA21. After sensing the first pixel row PR1 of the panel area PA21, the second pixel row PR2 to the j-th pixel row PRj of the area PA21 can be directly skipped to sense the first pixel column PR1 of the next panel area PA until skipping to the first pixel column PR1 of the panel area PAm1. It is understandable that j is any natural number, for example, 16, and can be set according to user needs. Therefore, row-skipping sensing can skip any number of rows, for example, 15 rows, to adjust the sensing speed and sensing resolution according to user needs.

In addition, in the present invention, since the pixel circuit 10 in the display device is used for both display and sensing functions, the sensing voltage Vsen of the pixel circuit 10 will be affected by the display content of adjacent rows. For example, when a pixel circuit 10 located in the display panel 50 is in the sensing phase and other pixel circuits 10 adjacent to the pixel circuit 10 are in the display phase, the content displayed by the other pixel circuits 10 will affect the sensing voltage Vsen of the pixel circuit 10. For example, the sensing voltage Vsen of the pixel circuit 10 when the diode LED in the other pixel circuit 10 emits light will be different from the sensing voltage Vsen of the pixel circuit 10 when the diode LED in the other pixel circuit 10 does not emit light. Therefore, the display device 1 of the present invention includes a compensation comparison part for comparing and calibrating the sensing voltage Vsen of the diode LED based on the content displayed by the diode LED of the pixel circuit 10 in the display phase adjacent to the diode LED of the pixel circuit 10 in the sensing phase.

Finally, the technical features of the present invention and its achievable technical effects are summarized as follows:

First, the display device of the present invention can realize both display and sensing functions in the same pixel circuit to have an in-screen sensing function.

Second, since the display device of the present invention uses the same pixel circuit to realize both display and sensing functions at the same time, there is no element between the sensed object and the sensor that will block the light. Therefore, the present invention can achieve more accurate sensing.

Third, since the display device of the present invention uses the same pixel circuit to achieve both display and sensing functions, the total thickness of the screen is thinner, redundant manufacturing processes are not required, and the yield risk caused by additional bonding is reduced.

Fourth, since the display device of the present invention can perform row-skipping sensing, the sensing speed can be increased according to user needs.

Fifth, the display device of the present invention can compare and calibrate the diode according to the display content of the diode of the pixel circuit in the display phase adjacent to the diode of the pixel circuit in the sensing phase. Therefore, it can provide sensing accuracy and correctness.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A display device, comprising:
a display panel having a plurality of sub-pixel areas, each sub-pixel area comprising a pixel circuit, each pixel circuit comprising:
a diode, configured to a forward-biasing state in a display phase of the pixel circuit for light-emitting and configured to a reverse-biasing state in a sensing phase of the pixel circuit for light-sensing;
a driving transistor, for driving the diode in the display phase;
a readout transistor, with a gate being applied with a sensing voltage in the sensing phase for serving as a source follower;
first to seventh transistors, gates of the first to seventh transistors being applied with gate control signals, so that the pixel circuit switches between the display phase and the sensing phase; and
a capacitor, for storing a data voltage to be written to the diode in the display phase;
a first circuit, for applying the gate control signals to each pixel circuit to make each pixel circuit switch between the display phase and the sensing phase; and
a second circuit, for applying an initialization voltage, the data voltage, a driving voltage, and a common voltage, and the second circuit comprising a plurality of readout circuits, each readout circuit reading out the sensing voltage of a corresponding pixel circuit during the sensing phase of the corresponding pixel circuit;
wherein the gate control signals include first to fourth gate control signals, and the first gate control signal is applied to the gates of the first transistor and the fifth transistor, the second gate control signal is applied to the gates of the second transistor and the third transistor, the third gate control signal is applied to the gates of the fourth transistor and the sixth transistor, and the fourth gate control signal is applied to the gate of the seventh transistor.

2. The display device according to claim 1, wherein:

the diode comprises one of a micro light-emitting diode (micro-LED), a sub-millimeter light-emitting diode (mini-LED), and an organic light-emitting diode (OLED); and the transistors comprise one of or any combination of P-type metal oxide semiconductor field effect transistors (MOSFET), N-type MOSFETs, thin film transistors (TFT), low-temperature polycrystalline silicon TFTs, and low-temperature polycrystalline oxide TFTs.

3. The display device according to claim 1, wherein:

each readout circuit is connected to a corresponding pixel circuit of the plurality of pixel circuits in a same row to read out the sensing voltages in the pixel circuits in the same row, and each readout circuit includes an analog-to-digital converter to perform analog-to-digital conversion for reading out the sensing voltage of the corresponding pixel.

4. The display device according to claim 1, wherein in each pixel circuit, a first electrode of the first transistor is applied with the driving voltage, and a second electrode of the first transistor is connected to a first node;

a first electrode of the second transistor is applied with the data voltage, and a second electrode of the second transistor is connected to the first node;

a first electrode of the third transistor is connected to a second node, and a second electrode of the third transistor is connected to a third node;

a first electrode of the fourth transistor is connected to the second node, and a second electrode of the fourth transistor is connected to a fourth node;

a first electrode of the fifth transistor is connected to the third node, and a second electrode of the fifth transistor is connected to a fifth node;

a first electrode of the sixth transistor is connected to the fourth node, and a second electrode of the sixth transistor is connected to the fifth node;

a first electrode of the seventh transistor is connected to the fourth node, and a second electrode of the seventh transistor is connected to a first electrode of the readout transistor;

a gate electrode of the driving transistor is connected to the second node, a first electrode of the driving transistor is connected to the first node, and a second electrode of the driving transistor is connected to the third node;

a gate of the readout transistor is connected to the fifth node, the first electrode of the readout transistor is connected to the second electrode of the seventh transistor, and a second electrode of the readout transistor is applied with the common voltage;

a first electrode of the diode is connected to the fifth node, and a second electrode of the diode is applied with the common voltage;

one end of the capacitor is applied with the driving voltage, the other end is connected to the second node; and the initialization voltage is applied to the fourth node.

5. The display device according to claim 4, wherein:

the sensing phase comprises:

a first sensing phase, for initializing the pixel circuit and the diode, so that the pixel circuit can write the data voltage and the diode is in the reverse-biasing state; and a second sensing phase, wherein the diode begins to accumulate charges to generate the sensing voltage and the sensing voltage is read out; and the display phase includes:

a first display phase, for writing the data voltage; and a second display phase, for causing the diode to emit light according to the data voltage.

6. The display device according to claim 5, wherein:

in the first sensing phase, the first to fourth gate control signals control the first to seventh transistors, so that the fourth transistor and the sixth transistor are on, while the first transistor, the second transistor, the third transistor, the fifth transistor, and the seventh transistor are off until the fourth transistor is turned off before the second sensing phase starts;

in the second sensing phase, the first to fourth gate control signals control the first to seventh transistors so that the seventh transistor is on, the first transistor, the second transistor, the third transistor, the fourth transistor, the fifth transistor, and the sixth transistor are off until the seventh transistor is turned off before the first display phase starts;

in the first display phase, the first to fourth gate control signals control the first to seventh transistors, so that the second transistor and the third transistor are on, while the first transistor, the fourth transistor, the fifth transistor, the sixth transistor and the seventh transistor are off; and in the second display phase, the first to fourth gate control signal controls the first to seventh transistors, so that the second transistor, the third transistor, the fourth transistor, the sixth transistor and the seventh transistor are off, while the first transistor and the fifth transistor are turned on after the second display phase starts.

7. The display device according to claim 5, wherein in the second sensing phase, the readout transistor is used as the source follower, so that the sensing voltage is input to the gate of the readout transistor through the fifth node, and the sensing voltage is read out as an output voltage located in the readout circuit.

8. The display device according to claim 1, wherein:

the display panel comprises a plurality of panel areas, each panel area includes a first pixel row to a j-th pixel row, each pixel row includes a plurality of sub-pixel areas, and by applying the gate control signals to each pixel circuit, after a pixel row of a panel area completes the sensing phase, a corresponding pixel row in a next panel area immediately executes the sensing phase.

* * * * *